United States Patent

Chudoba et al.

[11] Patent Number: 5,769,698
[45] Date of Patent: Jun. 23, 1998

[54] POLISHING DISC FOR HOLDING CONNECTOR-MOUNTED OPTICAL FIBERS

[75] Inventors: Paul Chudoba, Shohola; Jerome Polizzi, Morrisville, both of Pa.

[73] Assignee: NuVisions International, Inc., Shohola, Pa.

[21] Appl. No.: 799,847

[22] Filed: Feb. 13, 1997

[51] Int. Cl.[6] .................................................. B24B 19/00
[52] U.S. Cl. ........................... 451/386; 451/387; 451/41; 451/391; 269/287
[58] Field of Search ................ 451/41, 42, 43, 451/51, 367, 378, 384, 386, 389, 390, 391; 269/287

[56] References Cited

U.S. PATENT DOCUMENTS

| | | |
|---|---|---|
| 264,877 | 9/1882 | Heyer .................................. 451/386 X |
| 4,831,784 | 5/1989 | Takahashi . |
| 4,905,415 | 3/1990 | Moulin . |
| 5,140,779 | 8/1992 | Grois ................................... 451/386 X |
| 5,216,846 | 6/1993 | Takshashi . |
| 5,321,917 | 6/1994 | Franklin et al. ......................... 451/386 |
| 5,643,064 | 7/1997 | Grinderslev et al. ............... 451/386 X |

*Primary Examiner*—Timothy V. Eley
*Attorney, Agent, or Firm*—Charles S. McGuire; George R. McGuire

[57] ABSTRACT

A fixture of disc-like form for holding connector mounted optical fiber ferrules. When the connector is attached to the fixture, the ends of the ferrule and fiber extend slightly beyond the plane of the bottom surface of the fixture so that the end surfaces may be polished by movement of the fixture over a sheet of polishing paper. The ferrule, and consequently the fiber, are rotationally locked to the fixture to prevent relative movement therebetween during the polishing operation by an element removably positionable in cooperative engagement with the disc. The element is rotationally locked to both the disc and the fiber optic connector.

15 Claims, 3 Drawing Sheets

POLISHING DISC FOR HOLDING CONNECTOR-MOUNTED OPTICAL FIBERS

BACKGROUND OF THE INVENTION

The present invention relates to fixtures for holding the ferrules and associated connector assembly of optical fibers for purposes of polishing the end of the fiber. More specifically, the invention relates to a mounting fixture and fiber optic connector assembly providing improved versatility and polishing action.

Optical fibers are commonly mounted in tubular structure known as ferrules with the end surfaces of the fiber and ferrule coplanar. Periodically during use the end surfaces of the fiber and ferrule must be polished to remove any dirt or other foreign matter and to maintain smooth, flat, coplanar end surfaces of fiber and ferrule. The most common means of performing such polishing operations is to engage the ferrule, and a connector assembly associated therewith, in a fixture in the nature of a disc. The distal end of the ferrule extends through an opening in the disc so that the end surfaces of the fiber and ferrule are flush with the bottom surface of the disc, which is placed on a sheet of polishing paper. The disc is then moved manually, commonly in a figure-8 motion, across the paper to effect the desired frictional polishing action. The polishing paper is sometimes wetted prior to use, and grooves are formed in the bottom surface of the disc for accumulation of dirt and other matter removed in the polishing operation. While it is apparent that the polishing action is a result of fictional contact and relative movement between the ferrule/fiber end surfaces and the paper, the fixtures upon which the optical fiber elements are mounted during the polishing operation are known throughout the industry as "polishing discs" and are so-termed herein.

In order to maximize efficiency of the polishing operation, it is desirable to maximize relative motion of the fiber and ferrule surface with the surface of the paper during movement of the disc. The engagement of the ferrule/connector and disc is such that relative rotation of the two may occur. Consequently, when moving the disc in the common figure-8 pattern with the end surfaces of the fiber and ferrule in frictional contact with the paper, the ferrule may rotate relative to the disc during portions of the movement with consequent loss of the desired relative motion between the opposing surfaces of the fiber/ferrule and the paper.

It is also common practice to fabricate polishing discs which are compatible with only a single style of fiber optic connector structure. Thus, it is necessary to procure a family of polishing discs in order to provide the capability of polishing ferrule/fibers fitted with differing connector styles. Some polishing discs are provided with a plurality of openings and cavities, each compatible with a different connector style. Although this provides the capability of polishing more than one ferrule/fiber at a time, or for using a single disc with any of several connector style, the major cost is in the machining of the individual cavity structures. Consequently, this option does not provide a great deal of economy over the use of an individual disc with each connector style. Moreover, the fiber/ferrules are still subject to rotation relative to the disc in the manner noted above.

It is a principal object of the present invention to provide a fiber optic polishing disc which essentially eliminates lost relative motion between the end surfaces of the fiber/ferrule and the polishing paper, thus providing maximized polishing action.

It is a further object to provide a polishing disc having a single opening and surrounding cavity structure which is compatible with fiber optic ferrules fitted with a plurality of connector styles, whereby an individual disc with a single machined cavity may be used in lieu of the family of discs or the single disc with multiple machined cavities previously required.

In a more general sense, the object of the invention is to provide a novel and improved polishing disc or polishing disc assembly for use with fiber optic components.

Other objects will in part be obvious and will in part appear hereinafter.

SUMMARY OF THE INVENTION

The polishing disc of the present invention includes the usual circular, relatively flat disc with grooves formed in its bottom surface and a central, through opening. A cavity having square or rectangular outer walls surrounds the central opening on the top surface. A cylindrical tube-like portion extends integrally from the base of the recess toward the plane of the top surface of the disc and defines the inner wall of the cavity. A split spring bushing is positioned with its lower end within the tube-like portion. A hollow retainer cap is placed over the upper end of the split bushing and glued to the tube-like portion, thereby capturing the bushing within the tubular portion and the cap, similar to portions of the structure disclosed in application no. 08/714,797, filed Sep. 13, 1996 and assigned to the assignee of the present application.

An axial ferrule fitted with a first, standard style of connector assembly may be inserted through the open top of the end cap and through the spring bushing and opening in the polishing disc until the end surfaces of the ferrule and fiber mounted therein are flush with the bottom surface of the disc. The bushing is dimensioned to frictionally engage the ferrule. Portions of the first style of connector engage portions of the disc to prevent relative rotation of the ferrule and disc. When ferrules fitted with other styles of connectors are to be engaged with the polishing disc a removable insert is positioned within the cavity. The insert includes a through opening surrounding the tube-like portion within the cavity in the disc. The outer walls of the insert fit within the walls of the cavity to prevent relative rotation of the insert and disc. Keyways in the insert are engaged by structure on the connector styles compatible with the insert to prevent relative rotation of the ferrule and insert.

The foregoing and other features of the invention will be more readily understood and fully appreciated from the following detailed description, taken in conjunction with the accompanying drawings.

DETAILED DESCRIPTION

Figure 1:
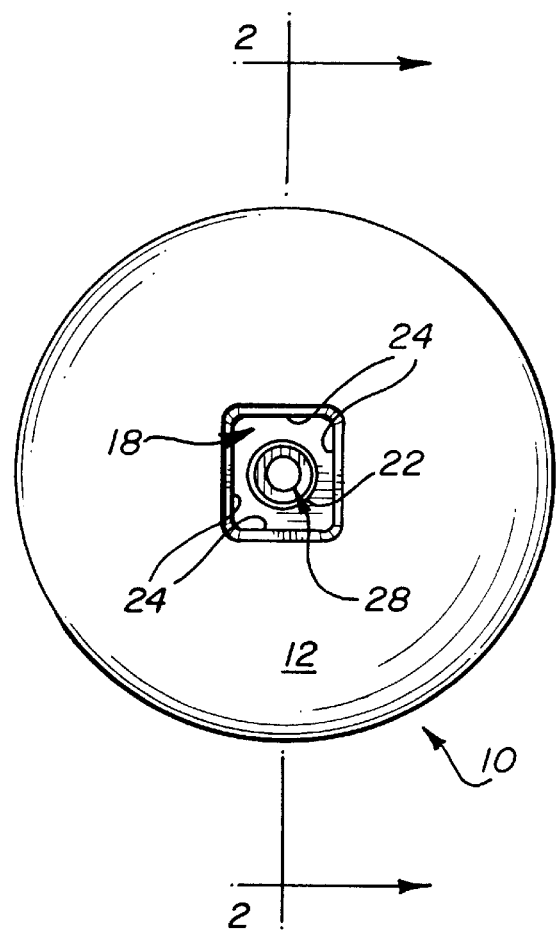
FIG. 1 is a top plan view of the polishing disc of the invention.
Figure 2:
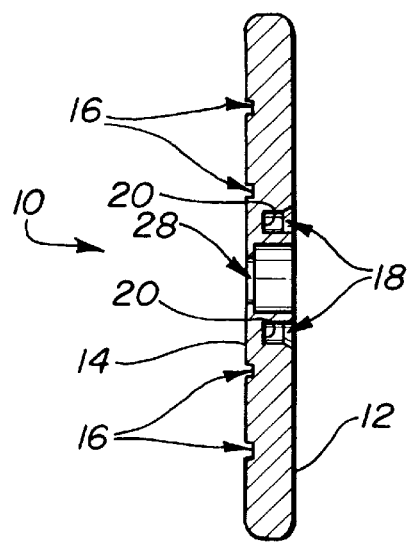
FIG. 2 is a side elevational view in section on the line 2—2 of FIG. 1.
Figure 3:
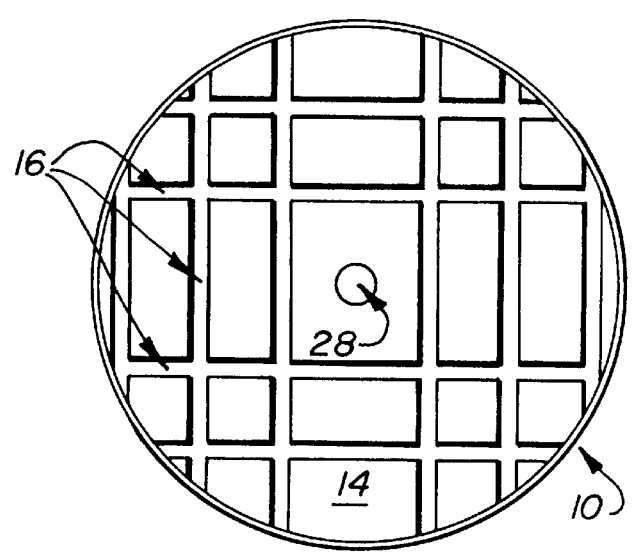
FIG. 3 is a bottom plan view of the disc.

Referring now to the drawings, the relatively flat, circular, polishing disc of the invention is denoted generally by reference numeral 10. What are termed the top and bottom surfaces of disc 10 are indicated by reference numerals 12 and 14, respectively. A gridwork of shallow (e.g., 0.020" deep) grooves 16 is formed in bottom surface 14 for collecting foreign matter removed during the polishing operation, in accordance with conventional practice. Cavity 18 extends into top surface 12 to floor or base 20. Tube-like portion 22 extends from cavity base 20 to the plane of top surface 12. The outer periphery of cavity 18 is rectangular, defined by side walls 24, and the inner periphery is cylindrical, defined by the outer surface of tubular portion 22.

Figure 4:
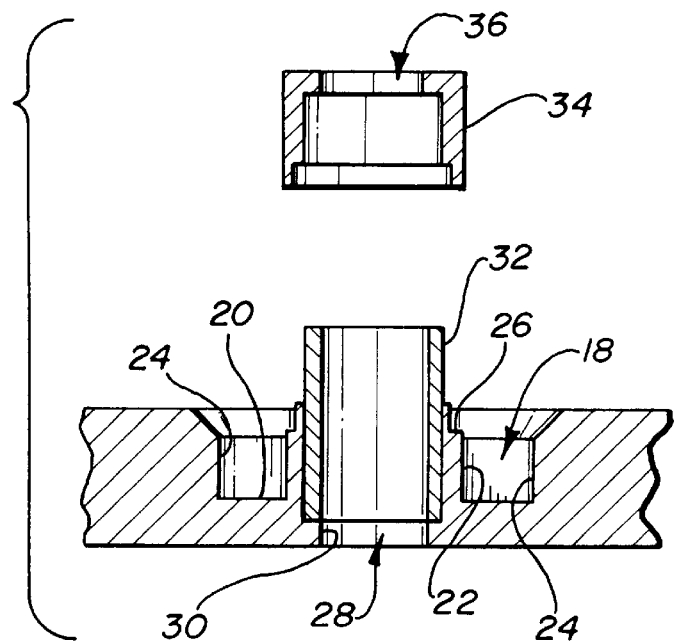
FIGS. 4 and 5 are enlarged fragments of FIG. 2 showing additional structure, also in section, assembled therewith.
Figure 5:
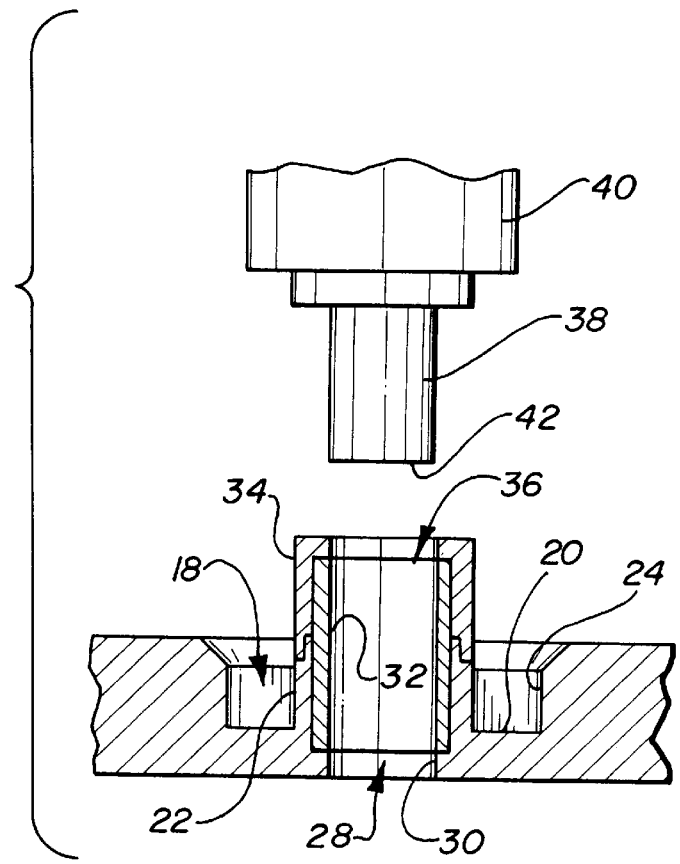

As best seen in FIG. 4, upper section 26 is of reduced diameter on the exterior of tubular portion 22, and through opening 28 is of reduced diameter in lower section 30. Split spring bushing 32, designed to frictionally engage a standard sized optical fiber ferrule in the manner described in previously mentioned application no. 08/714,797, is inserted into opening 28 and retained at its lower end by reduced diameter section 30. Hollow retainer cap 34 having circular opening 36, is placed over and glued or otherwise affixed to upper section 26 of tubular portion 22, thereby retaining the upper end of bushing 32, as seen in FIG. 5.

An SC style connector body has a rectangular configuration, compatible with the outer periphery of cavity 18. When ferrule 38, fitted with SC connector assembly 40, is inserted axially through end cap opening 36 and pushed axially through bushing 32, the connector body enters cavity 18 and seats against base 20 thereof. Dimensions are such that when the internal spring of connector assembly 40 is compressed and ferrule 38 is seated within the connector body, the end surfaces of ferrule 38, the fiber mounted therein project slightly (e.g., 0.015") beyond the plane of bottom disc surface 14, in proper position for the polishing operation and rotationally locked with respect to disc 10.

Figure 6:
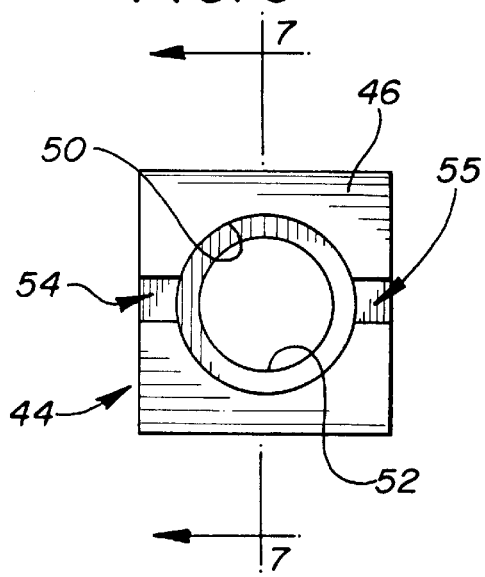
FIG. 6 is a top plan view of a removable insert for use with the disc in certain applications.
Figure 7:
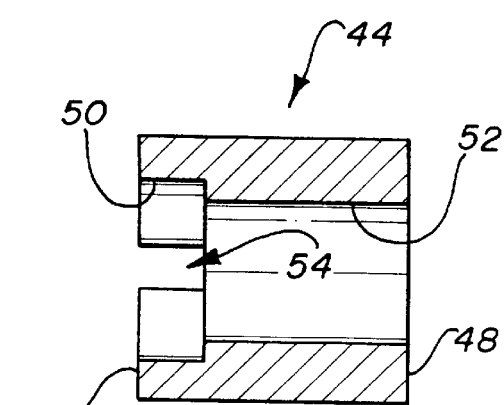
FIG. 7 is a side elevational view in section on the line 7—7 of FIG. 6.

In FIGS. 6 and 7 is shown an insert 44 of a type used with disc 10 when polishing ferrules and fibers having ST and FC style connector assemblies. Insert 44 has top and bottom surfaces 46 and 48, respectively, a rectangular outer periphery and a central, circular, through opening having sections 50 and 52 of relatively larger and smaller diameters, respectively. Insert 44 is dimensioned to be placed in cavity 18, resting on base 20 thereof, surrounded on the sides by walls 24 with tubular portion 22 extending into section 52 of the central opening. Notches or keyways 54 and 55 extend into top surface 46 from upper section 50 of the central opening to opposite, outer walls.

Figure 8:
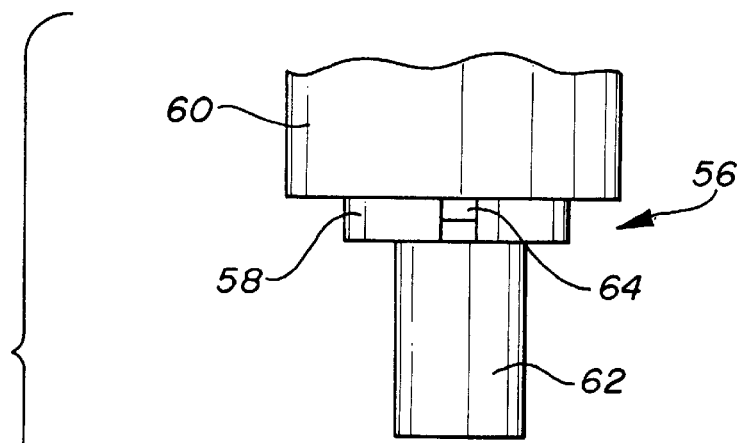
FIG. 8 is a fragmentary, elevational view in section showing the manner of association of a ferrule and connector with an insert and disc.
Figure 8:
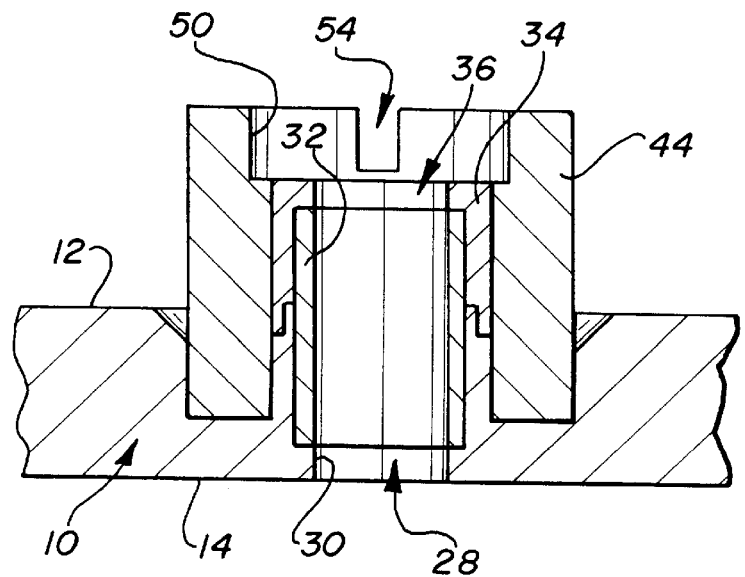

The body portions, consisting of inner and outer shells, of ST and FC style connector assemblies are of cylindrical form. A fragment of one such connector assembly 56 is shown in FIG. 8 spaced above insert 44. Connector 56 includes cylindrical, inner and outer shells 58 and 60, respectively, mounted for relative axial movement and biased by an internal coil spring (not shown). Ferrule 62 extends through connector 56. Key 64 extends outwardly from inner shell 58, below outer shell 60, all such structure being conventional in ST and FC style connector assemblies.

As ferrule 62 is inserted through opening 36 in retainer cap 34 and bushing 32, key 64 is received in one or the other of keyways 54 and 55. Insert 44 is rotationally fixed with respect to disc 10 by the close fit of the insert in rectangular cavity 18; connector assembly 56 is rotationally fixed with respect to insert 44 by means of key 64 engaging one of keyways 54 and 55; in addition, ferrule 62 is frictionally engaged within bushing 32. Thus, ferrule 62 and the fiber mounted therein are effectively rotationally locked with respect to disc 10 and there is no lost motion (i.e., polishing action) due to rotation of the ferrule relative to the polishing disc when moving the latter in the usual manner.

It is necessary, of course, to dimension insert 44 for compatibility with a particular style of connector assembly so that when the connector is fully engaged the end surface of the ferrule will be in a plane spaced slightly outwardly from the plane of bottom disc surface 14. For example, although the length, width and diameter of section 52 of the central opening may be the same for inserts to be used with ST and FC style connector assemblies, the height of the insert would be less and the width of the keyways and the depth and diameter of opening section 50 would be greater in an insert to be used with an FC connector style than those used with an ST style. In any event, only certain dimensions are effected and all details of configuration remain the same.

What is claimed is:

1. Apparatus for use in frictionally polishing coplanar terminal end surfaces of optical fibers and ferrules wherein said fibers are mounted, said ferrules being coupled to industry-standard, fiber optic connector assemblies, said apparatus comprising a body member having:

a) a top side;
   b) a planar, bottom surface;
   c) at least one through opening having an axis perpendicular to said bottom surface, said opening being dimensioned for axial extension therethrough of one of said ferrules from said top side to position said end surfaces in a plane parallel to and spaced slightly outwardly from said bottom surface; and
   d) means for rotationally locking said ferrule with respect to said body member, said locking means comprising:
      i) a cavity extending into said top surface;
      ii) an element dimensioned for removable insertion into said cavity;
      iii) means for transmitting rotational movement of said body member to said element;
      iv) engagement means on said element for cooperative engagement with one of said connector assemblies to transmit rotational movement of said element to said connector assembly and thereby to said ferrule.

2. The invention according to claim 1 wherein said top side comprises a planar, top surface parallel to said bottom surface.

3. The invention according to claim 1 wherein said cavity surrounds said central opening.

4. The invention according to claim 3 wherein said cavity includes a planar base surface in a plane parallel to said bottom surface.

5. The invention according to claim 1 wherein said cavity is outwardly bounded by side walls and is rectangular in plan view.

6. The invention according to claim 1 wherein said means for transmitting rotational movement from said body member to said element comprise first side wall means within said cavity and second side wall means on said element, said first and second side wall means positioned for mutual engagement upon rotation of said body member to transmit said rotation to said element.

7. The invention according to claim 5 wherein said engagement means comprises a keyway in said element for receiving a key on said connector assembly upon said axial extension of said ferrule through said opening in said body member.

8. In a fiber polishing disc having a planar bottom surface and a through opening for insertion therethrough of a cylindrical ferrule coupled to an industry-standard fiber optic connector assembly, an optical fiber being mounted in said ferrule with terminal end surfaces of said ferrule and fiber substantially coplanar to place said end surfaces in a plane parallel to and spaced slightly outwardly from said bottom surfaces, whereby said end surfaces may be placed in contact with a polishing medium and polished by frictional contact with said medium as said disc is moved relative thereto, the improvement comprising:

cooperative, mutual engagement means on said connector assembly and said disc comprising an element removably positionable in cooperative engagement with said disc, said element including first means for preventing significant relative rotational movement of said element and said disc, and second means for preventing significant relative rotational movement of said element and said connector assembly, thereby preventing significant relative rotational movement of said disc and said ferrule.

9. The invention according to claim 8 wherein said second means comprises a keyway in said element and a key on said connector assembly, said key being received in said keyway upon insertion of said ferrule through said opening.

10. The invention according to claim 8 wherein said disc includes a top side, opposite said bottom surface, and a cavity extending into said top side and surrounding said opening, and wherein said mutual engagement means comprises first wall means within said cavity and second wall means on said connector.

11. The invention according to claim 10 wherein said opening has a central axis perpendicular to the plane of said bottom surface and said first and second wall means are in respective, spaced planes parallel to said axis.

12. The invention according to claim 8 wherein said improvement further includes a tubular bushing fixedly mounted in coaxial registration with said opening for frictionally engaging said ferrule when the latter is axially inserted through said bushing and said opening.

13. The invention according to claim 12 and further including a hollow, tubular portion integral to said disc and a retainer cap affixed to said tubular portion and cooperatively defining therewith a housing for said bushing, said cap having an aperture coaxially aligned with said bushing and said opening.

14. The invention according to claim 13 wherein said disc includes a top side, opposite said bottom surface, and a cavity extending into said top side and surrounding said opening, said cavity having a floor and said tubular portion extending upwardly from said cavity floor.

15. The invention according to claim 14 wherein said tubular portion defines an inner side, cylindrical wall of said cavity, and further including flat, planar wall means defining an outer side, rectangular wall of said cavity.

* * * * *